United States Patent
Chen et al.

(10) Patent No.: US 9,436,583 B1
(45) Date of Patent: Sep. 6, 2016

(54) MINIMALLY DISRUPTIVE DEBUGGING IN A PRODUCTION ENVIRONMENT

(71) Applicant: International Business Machines Corporation, Armonk, NY (US)

(72) Inventors: Tom C. L. Chen, Ontario (CA); Steven Cooper, Ontario (CA); Trong Truong, Ontario (CA)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 14/934,473

(22) Filed: Nov. 6, 2015

(51) Int. Cl.
*G06F 9/44* (2006.01)
*G06F 11/36* (2006.01)

(52) U.S. Cl.
CPC .................. *G06F 11/3636* (2013.01)

(58) Field of Classification Search
CPC .................................................. G06F 11/3636
See application file for complete search history.

(56) References Cited

U.S. PATENT DOCUMENTS

| 7,930,590 B2 | 4/2011 | Cheng et al. |
| 8,752,017 B2 | 6/2014 | Hossain et al. |
| 8,762,971 B2 * | 6/2014 | Bates ................ G06F 8/67 717/124 |
| 8,819,640 B2 * | 8/2014 | Bates ................ G06F 11/362 717/127 |
| 2011/0078666 A1 * | 3/2011 | Altekar ................ G06F 11/3636 717/131 |
| 2012/0047486 A1 * | 2/2012 | Ashish ................ G06F 11/3624 717/106 |
| 2013/0227256 A1 * | 8/2013 | Robertson ........... G06F 11/3636 712/244 |
| 2014/0026122 A1 | 1/2014 | Markande et al. |
| 2014/0245268 A1 * | 8/2014 | Golender ............ G06F 11/3636 717/128 |
| 2015/0033078 A1 | 1/2015 | Wintergerst et al. |

OTHER PUBLICATIONS

Yuan et al; Improving Software Diagnosability via Log Enhancement, vol. 30 Issue 1, Feb. 2012, Article No. 4 ACM New York, NY, USA.
Layman et al; Debugging Revisited, Toward Understanding the Debugging Needs of Contemporary Software Developers, 2013.

* cited by examiner

*Primary Examiner* — Philip Wang
(74) *Attorney, Agent, or Firm* — Garg Law Firm, PLLC; Rakesh Garg; Isaac J. Gooshaw (57) ABSTRACT

For debugging an application in a production environment, a breakpoint is set in the application. Responsive to the setting, recording is begun of information about a processing of a request in the application. Reaching the breakpoint is detected in the application during the processing of the request. A replica of the application is created including the breakpoint, the application becoming a primary application and the replica becoming a secondary application in a production environment. In the secondary application, a debugging operation is performed during a processing of a copy of the request after the breakpoint in the secondary application.

20 Claims, 6 Drawing Sheets

MINIMALLY DISRUPTIVE DEBUGGING IN A PRODUCTION ENVIRONMENT

TECHNICAL FIELD

The present invention relates generally to a method, system, and computer program product for debugging a failure in a data processing environment. More particularly, the present invention relates to a method, system, and computer program product for minimally disruptive debugging in a production environment.

BACKGROUND

A production data processing environment, or production environment (PE), is a configuration of data processing systems using which an operator of the data processing environment provides a service to an actual user, such as a business providing a service to a customer. For example, a banking organization operates a production data processing environment using which an actual customer of the banking organization performs a transaction with real money in the customer's account.

A development data processing environment, or development environment (DE), is a different configuration of data processing systems using which the operator of the production data processing environment develops, tests, or troubleshoots a service that is either being provided to the actual user in the operator's production environment, or is planned to be provided to the actual user in the operator's production environment. For example, the banking organization operates a development data processing environment in which either a customer transaction is simulated or a transaction from the production environment is recreated. For example, an actual customer of the banking organization does not interact with the development environment to perform a transaction with real money in the customer's account.

The separation between a production environment and a development environment is important for a variety of reasons. For example, when a new service is being developed, it is likely that the service may not be stable and may cause a system crash or data corruption. Therefore, the development or testing of the service is not desirable in the production environment, where a system crash can adversely affect other customer transactions, and where data corruption can, for example, corrupt real account balances. Therefore, the development and testing activities are performed in a development environment where a system crash, data corruption, or other adverse events do not disrupt the business operations of the operator of the production environment.

As another example, when an existing service encounters a failure in the production environment, presently, it is undesirable to troubleshoot the service in the production environment for similar reasons. For example, presently, the troubleshooting activities in the production environment can adversely affect real customer transactions, cause a disruption of a system or service, or corrupt the production environment's data. Therefore, the troubleshooting activities to determine and remedy a cause of a failure in the production environment are presently performed in a development environment where a system crash, data corruption, or other adverse events do not disrupt the business operations of the operator of the production environment.

SUMMARY

An embodiment includes a method that sets a breakpoint in the application. The embodiment begins, responsive to the setting, recording information about a processing of a request in the application. The embodiment detects that the breakpoint is reached in the application during the processing of the request. The embodiment creates a replica of the application, the replica including the breakpoint, the application becoming a primary application and the replica becoming a secondary application in a production environment. The embodiment performs, in the secondary application, a debugging operation during a processing of a copy of the request after the breakpoint in the secondary application.

An embodiment includes a computer program product. The computer program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Essentially, a problem in a production environment, such as a failure of a service in the production environment, entails a malfunction of a system, incorrect manipulation of data, or faulty operation of code. Debugging is the process of determining a cause of a problem and locating an operation that is a suspect in causing the problem. Many debugging tools (debuggers) are presently available for this purpose.

Presently, debugging is not desirable in a production environment for the reasons described earlier. Therefore, a debugger is often deployed, and the debugging is performed in a development environment.

In order to be able to debug a problem that has occurred in a production environment, presently it is necessary to recreate the specifics of the production environment in which the problem occurred. For example, if a banking transaction fails to make a change to a customer's account in a production environment of a banking system, troubleshooting the transaction and finding a cause of the problem requires not only the information about the transaction but also information about what else was occurring in the production environment when the transaction failed. For example, the transaction may have failed because too many other processes were trying to simultaneously access a particular data, the data was in an improper state because of a previous transaction, and many other such reasons.

The illustrative embodiments recognize that given such interdependencies between the events and data of a production environment, a presently used troubleshooting activity cannot be effective in a development environment unless the development environment can mirror the interdependencies that existed in the production environment. The illustrative embodiments further recognize that it is not sufficient to just copy the data from the production environment to the development environment interdependencies, but operations that occurred in the production environment that led to the problem must also be applied in the development environment.

The illustrative embodiments recognize that in many cases, a problem only shows up after an application has been deployed in a production environment. For example, there may be some input conditions in the production environment that are unanticipated during the development of the application and therefore are not tested before deployment. The problem manifests in the production environment when these unanticipated conditions are created during the application's execution in the production environment.

The illustrative embodiments further recognize that such unanticipated conditions may occur at a very low frequency. The rare occurrence of such conditions not only makes their recreation in the development environment difficult, their rarity also greatly increases the difficulty in isolating and diagnosing the problem.

The illustrative embodiments also recognize that many other circumstances, such as constraints and requirements of a cloud environment, uninterrupted availability requirement, fail over recovery mechanisms, and restricted or limited runtime diagnostic support further impede efforts to diagnose the problems occurring in the production environment.

Even though debugging a problematic application in a production environment is undesirable, the circumstances and the conditions under which a problem is experienced in the production environment often necessitate debugging the problematic application in the production environment.

The illustrative embodiments recognize that debugging a problem in a production environment can adversely affect the performance or functioning of the production system. Furthermore, because the problematic application is very likely to be operating in a scaled-up configuration in the production environment, the problem diagnosis in the production environment can adversely affect a potentially large number of application instances and undesirably deteriorate the user experience during the debugging. For these reasons, presently, when debugging in a production environment has to be undertaken, a log file-based problem isolation technique is employed for the debugging activity.

The illustrative embodiments recognize that the log file based problem isolation technique has several drawbacks. For example, the size of the log file size can be so large that understanding the events that led to the problem can be difficult or nearly impossible in a limited amount of time.

Furthermore, the log file alone may not be sufficient and many other external processes or data may have to be referenced in the production environment to fully comprehend the nature and effects of the events.

In many cases, the log file may only reveal that the existing version of the problematic application is logging information that is insufficient to diagnose the problem. Accordingly, a new version of the problematic application has to be created and deployed in the production environment, with the expectation that the problem will occur again and the new log entries, or traces, will provide more insight into the problem.

The illustrative embodiments recognize that even with extensive traces, it is difficult to map the traces to source code of the application and discern the data flow or the control flow that the log is describing. Simply collecting and handling voluminous logs is an expensive and time consuming activity. The limitations on storage, transport formats, and buffer sizes can further lead to dropped or lost trace information.

A less common presently used approach enables a recording capability within the production environment. The events occurring in the production environment are recorded as they occur, and the recording is then replayed in a development environment. The illustrative embodiments recognize that in practice, this approach is not very useful because for long running applications, the data generated by the recording can easily exceed all the available storage space.

Furthermore, a majority of production applications access files or databases in their operations. Recording the activities of such applications requires that the data being read or written be recorded as well. The inclusion of the data into the recordings makes it even more difficult to playback the recording and capture the events that may be useful in isolating the problem.

The illustrative embodiments used to describe the invention generally address and solve the above-described problems and other problems related to debugging problems occurring in a production environment.

An embodiment can be implemented as a software application. The application implementing an embodiment can be configured as a modification of an existing debugger, as a separate application that operates in conjunction with an existing debugger, as a stand-alone application, or some combination thereof.

A production application is a software application that is executing in a production environment and providing a function or a service in the production environment. The production application operates in a stateless manner, i.e., the production application processes requests, performs data manipulations, and outputs responses. The production system, as a whole, can include stateless components, e.g., the production application, and stateful components, e.g., a system of records such as a database). The illustrative embodiments are configured to debug a stateless component and virtualize a stateful component.

An embodiment monitors a production application in a production environment. During normal operations of the production application, the production application performs as programmed.

Suppose that an operation of the production application has to be investigated for debugging purposes. For example, it may be that the production application code has various paths or flows that the processing of various requests can take. Assume that one such path is to be investigated.

The embodiment causes the debugger to set a breakpoint in the production application. The breakpoint causes the execution of the production application to perform an operation when the breakpoint is reached, i.e., when the breakpoint is reached during the execution of the production application. The embodiment causes the breakpoint to be set in such a way that the execution of the production application continues in the production environment up to the breakpoint, outputs an indication that the breakpoint is reached, and thereafter the execution of the production application resumes from the breakpoint and proceeds normally in the production environment.

In response to the breakpoint being set, the embodiment further causes a recording of the events and operations occurring in the production application to begin. In response to the setting of the breakpoint, the embodiment also causes the production application to be replicated. Replication causes another instance of the production application to be instantiated in the production environment.

Hereinafter, the instance of the production application in which the breakpoint is set is referred to as a "primary application" or simply "primary", and the instance that is created as a result of the replication is referred to as a "secondary instance" or simply "secondary". The primary application and secondary application both execute in the production environment.

Furthermore, because the breakpoint only causes an output of an indication that the breakpoint was reached, the effect of the breakpoint on the performance of the primary application is negligible and imperceptible to the users of the primary application in the production environment. The effect of the breakpoint on the performance of the primary application is also negligible and imperceptible to the users of the primary application in the production environment because the primary application continues processing the request that caused the breakpoint to be reached and returns a result, and the primary application also continues processing other requests in this manner whether such processing causes the breakpoint to be reached again or not.

When the secondary application is created, the embodiment also causes a reissue of the request—whose processing in the primary application reached the breakpoint—to the secondary application. A reissue of a request is the making of a copy of the request and directing the copy of the request to the secondary application.

In the secondary application, an embodiment causes the reissued request to proceed normally until the breakpoint. Particularly, using the recording made with the processing at the primary application, the embodiment causes the reissued request to perform all operations recorded in the recording except an interaction with a resource external to the primary application and the secondary application. A non-limiting example of an external resource is a database, and a non-limiting example of an external interaction may be a manipulation of data in the database.

For example, suppose that an original request R1 caused the breakpoint to be reached in the primary application. A copy R1' of request R1 is sent to the secondary application. While processing R1, the primary application modified some data in a database. If the processing of R1' in the secondary application also modifies the database, such modification will put the data in the database in an incorrect state due to duplicate manipulations from the primary application and the secondary application.

Therefore, an embodiment prevents the processing of R1' in the secondary application from interacting with an external resource. Instead, when the processing of R1' in the secondary application has to interact with an external resource, the embodiment simulates the interaction using the recording. In other words, if the external interaction was to request data from an external resource, instead of allowing a request for the data from the secondary application to reach the external resource, the embodiment supplies the requested data from the recording. The recording includes the details of such interactions, to wit, the nature of the interaction, the specifics of the interaction, the supplied data in the interaction, the received data in the interaction, the operation of the interaction, and any other aspect of the external interaction to facilitate the use of the recording as a virtual external resource standing in for the actual external resource for the purposes of the interaction.

Once the processing of the reissued request reaches the breakpoint in this manner, an embodiment allows a debugger to step through the code of the secondary application, or perform another debugging operation on the code of the secondary application, starting from the breakpoint and thereafter. Debugging a path of process flow through the code of secondary application in this manner provides the debugger the actual circumstances of the production environment where the problem occurred, and sets up the context of the problem properly in the secondary application using a limited amount of recording. Debugging in this manner also allows the users of the production environment to continue using the primary application normally without being affected by the debugging operations occurring at the secondary application.

In one embodiment, the roles of the primary application and the secondary application are reversed after the breakpoint is reached. For example, the embodiment causes the breakpoint to be set in the primary application and the secondary application to be created as described earlier. When a request processing reaches the breakpoint, the embodiment also causes the reissue in the manner described earlier.

However, thereafter, the secondary application continues the processing of the reissued request and other requests thereafter as the production application. The primary application halts at the breakpoint and becomes the instance that is to be used for the debugging. The embodiment causes the debugger to step through the code of the primary application to debug the problem.

In such an embodiment, a recording is not needed to be made from the primary application's processing prior to reaching the breakpoint in the primary application because in response to the secondary application taking over the processing of the requests, the secondary application begins to perform the external interactions with the external resources. The secondary application starts to make a recording in response to secondary application taking over the processing from the primary application. In response to the primary application being ready to step through from the breakpoint, the primary application uses the recording made by the secondary application to avoid any duplicate external interactions in a manner described herein.

A method of an embodiment described herein, when implemented to execute on a device or data processing system, comprises substantial advancement of the functionality of that device or data processing system in debugging a problem in a production environment. For example, presently available methods of debugging require either reproducing the problem in a development environment or combing through the logs of the production environment to identify a cause of the problem in the production environment. An embodiment makes it possible to debug a production application while the production application operates in the production environment, but without adversely affecting the users or the performance of the production application in the production environment. An embodiment also enables such debugging by storing only a limited amount of recorded information, as compared to the recordings presently created over an arbitrarily long period of operation of the production application. This manner of minimally disruptive debugging in a production environment is unavailable in presently available methods. Thus, a substantial advancement of such devices or data processing systems by executing a method of an embodiment is in improving the chances of successfully determining a cause of a problem in a production environment by performing the debugging in the actual environment where the problem occurred.

The illustrative embodiments are described with respect to certain source code, executable code, breakpoints, requests, processing, recording operation, recorded information, external resources, external interactions, replication, reissue, debugger, debugger operations, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
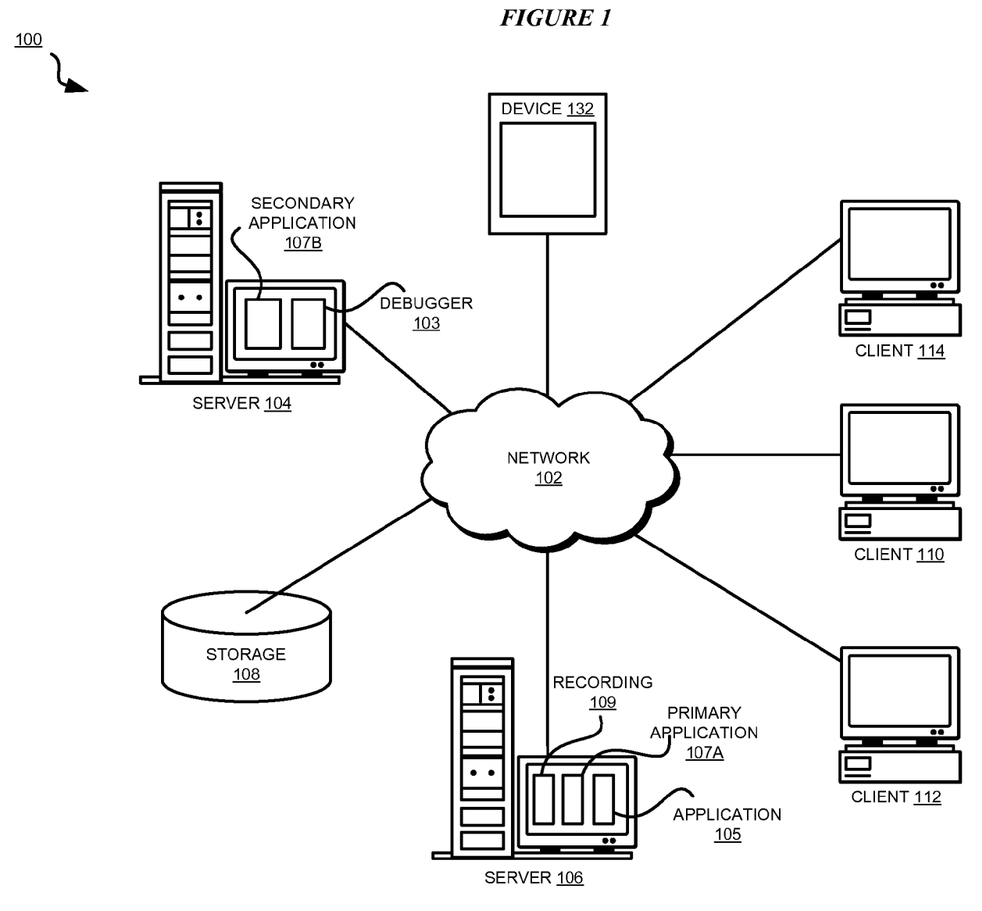
FIG. 1 depicts a block diagram of a network of data processing systems in which illustrative embodiments may be implemented.
Figure 2:
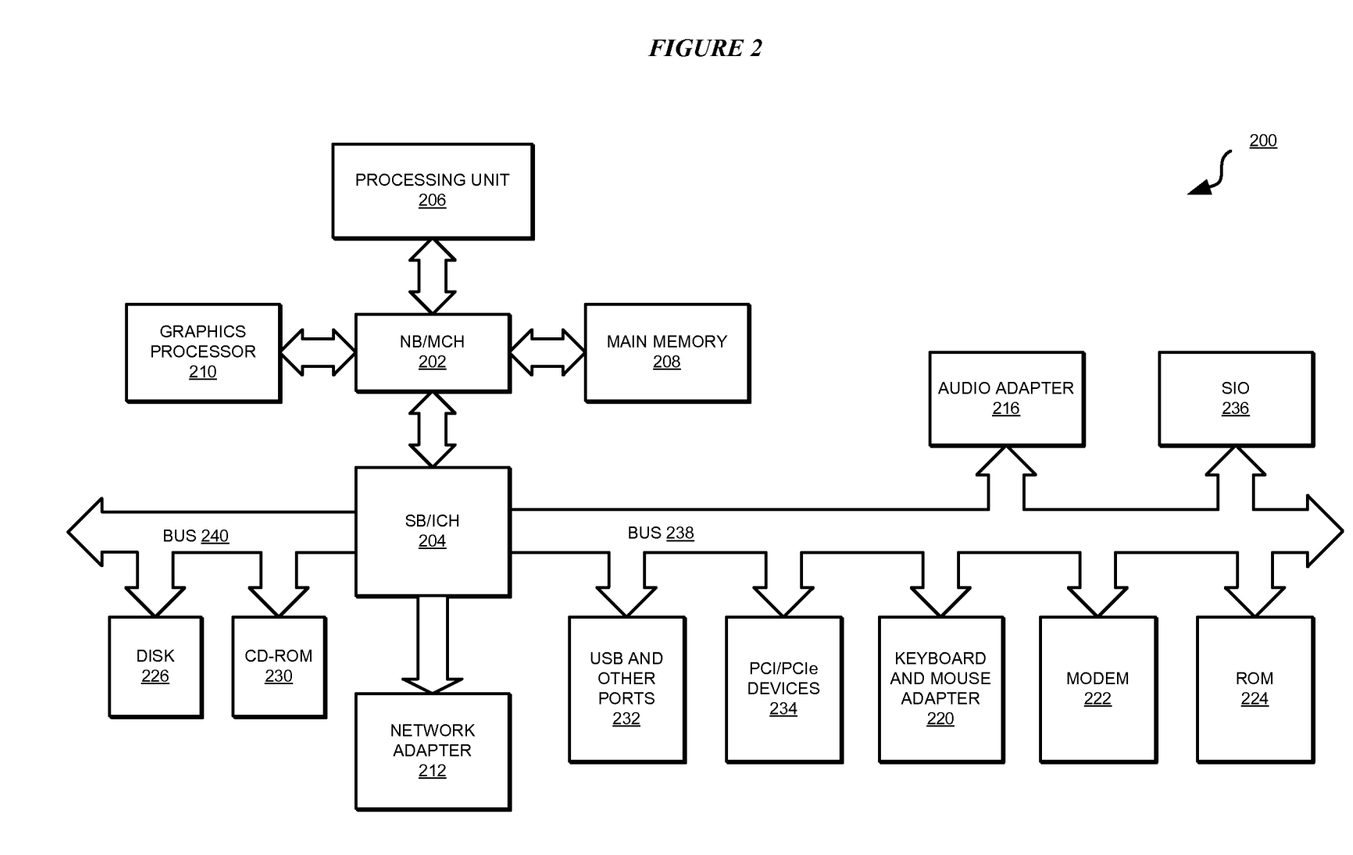
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Debugger 103 is an existing debugger that has been modified or otherwise enabled according to an embodiment to operate with application 105 in a manner described herein. Servers 104 and 106 are data processing systems in a production environment. A production application operates on server 106. Primary application 107A and secondary application 107B are constructed corresponding to the production application and operated on servers 106 and 104, respectively, in a manner described herein. Generally, but not necessarily, application 105 is on the same server (106) as primary application 107A, in order to intercept a request sent to application 107A. The request is intercepted so that application 105 can replicate the request to send to secondary application 107B. Debugger 103 can be a single component or two components—including a front-end UI and back-end debugging engine. In either case, the single component or at least the engine component of debugger 103 is on the same server (104) as secondary application 107B that is to be debugged, in order for debugger 103 to control secondary application 107B. Primary application 107A and secondary application 107B need not to be on the same server or virtual machine. If primary application 107A and secondary application 107B are on different servers (shown), application 105 sends the replicated request through network 102 to 107B. In one embodiment (not shown), server 106 executes a virtual machine (not shown), and primary application 107A and secondary application 107B both execute in the same virtual machine. Recording 109 is a recording made during the execution of primary application 107A after setting the breakpoint, or after secondary application 107B takes over as the production application, as the case may be.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
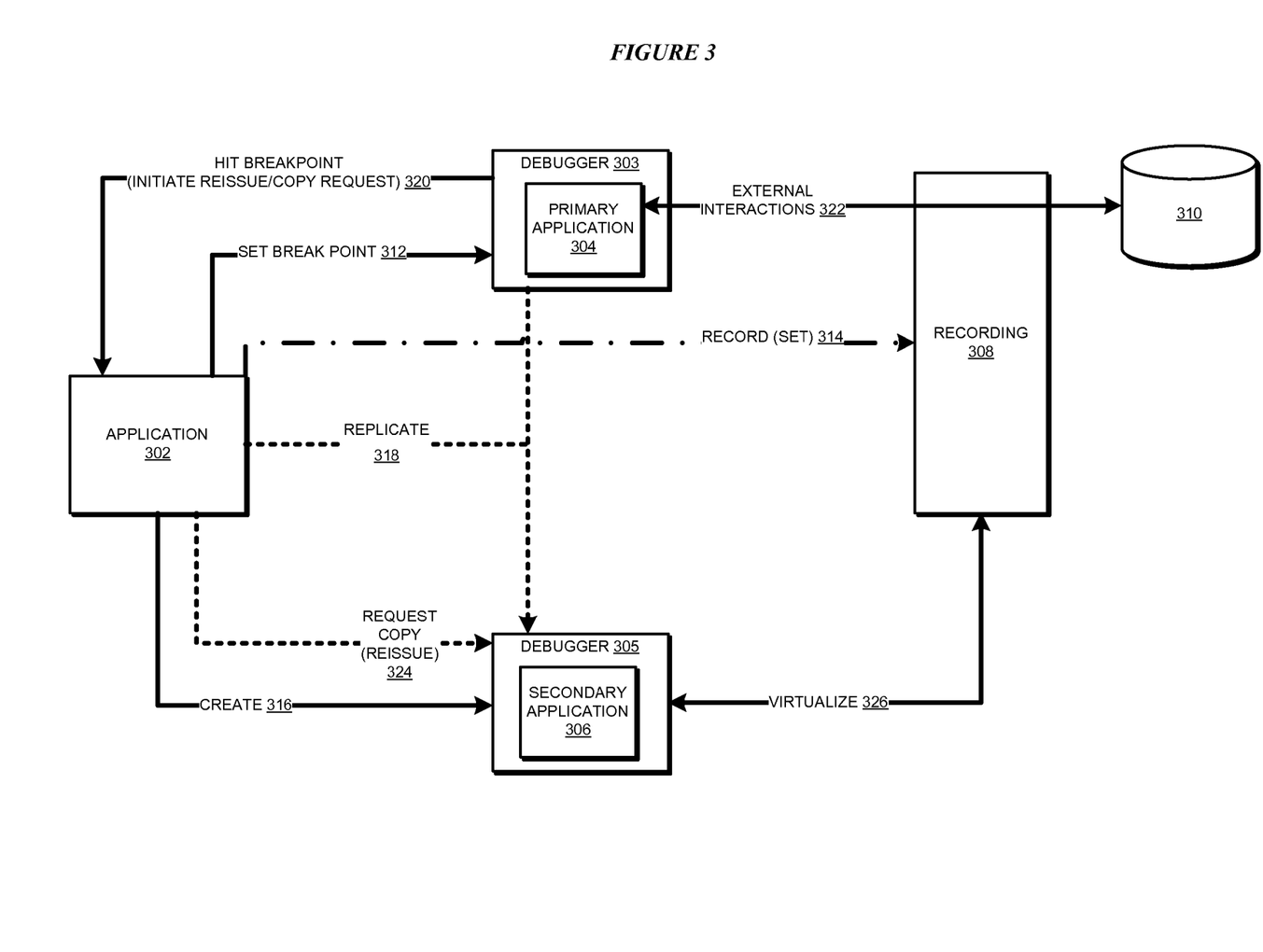
FIG. 3 depicts a block diagram of an example configuration for minimally disruptive debugging in a production environment in accordance with an illustrative embodiment.

With reference to FIG. 3, this figure depicts a block diagram of an example configuration for minimally disruptive debugging in a production environment in accordance with an illustrative embodiment. Application 302 is an example of application 105 in FIG. 1. Debugger 303 attaches to primary application 304 using standard debugger attachments such that application 304 requires no modification to debug, e.g., to set a breakpoint as described herein. Primary application 304 is an example of primary application 107A in FIG. 1. Debugger 303 is an example of debugger 103 in FIG. 1. Secondary application 306 is an example of secondary application 107B, and recording 308 is an example of recording 109 in FIG. 1. Debugger 305 attaches to secondary application 306 using standard debugger attachments such that application 306 requires no modification to debug, e.g., to step through the code past a breakpoint as described herein. Debugger 305 is an example of debugger 103 in FIG. 1.

For the clarity of the description, FIG. 3 depicts a configuration where primary application 304 remains the production application in the production environment after reaching a breakpoint, and the debugging activity occurs in secondary application 306. Accordingly, external resource 310 is any suitable resource with which primary application 304 performs external interactions in a manner described herein. Only as a non-limiting example, external resource 310 is depicted as a data storage, such as a database.

In setting operation 312, application 302 sets a breakpoint, or causes a breakpoint to be set, such as by debugger 303, in primary application 304. At the time of setting operation 312 or as soon as practicable thereafter in the production environment, recording operation 314 begins contributing data of the processing activities in primary application 304 to recording 308.

According to one embodiment, at the time of setting operation 312 or at least before the breakpoint is reached, in replicate operation 318, application 302 creates (316) secondary application 306 from primary application 304. Alternatively, instead of create operation 316, application 302 can cause another application, such as an application-level load distributing proxy (not shown), to replicate (318) secondary application 306 from primary application 304. According to another embodiment, application 302 creates (316) or starts secondary application 306 in response to primary application 304 being created or started. In either embodiment, primary application 304 does not perform any function that primary application 304 is not originally programmed to perform. Replication 318 is a function of application 302.

In normal operations, primary application 304 performs external interactions 322 with external source 310. In response to application 302 detecting that the breakpoint is set in application 304, application 302 instructs a recorder, such as a recorder in debugger 303, to intercept and record external interactions 322 in recording 308.

Application 302 receives a request from the network for application 304, and forwards the request to debugger 303 to send to primary application 304. In one embodiment, application 302 receives a request from the network for application 304, and forwards the request to primary application 304 directly. Regardless of how forwarded, application 302 makes a copy of the request. The breakpoint is set in secondary application 306 in response to secondary application 306 being created or in response to the breakpoint being set in primary application 304, as the case may be. Responsive to the forwarded request from application 302 to primary application 304 causing primary application 304 to hit a breakpoint, debugger 303 informs application 302 that a breakpoint has been hit.

Application 302 performs, or causes to be performed, reissue operation 320 of the request that caused the breakpoint to be reached in primary application 304. For example, application 302 copies the request and either reissues to secondary application 306 directly, or sends the reissued request to debugger 305 which then sends the reissued request to secondary application 306. Regardless of the particular manner of forwarding, secondary application 306 receives copy 324 of that request.

To reach the breakpoint in the processing of request copy 324, application 302 virtualizes (326), for secondary application 306, an external transaction similar to external transaction 322, by causing debugger 305 to use recording 308 instead of external resource 310. In response to the breakpoint being reached in secondary application 306, application 302 debugs, or causes debugger 305 to debug, the processing of request copy 324 starting at the breakpoint.

Figure 4:
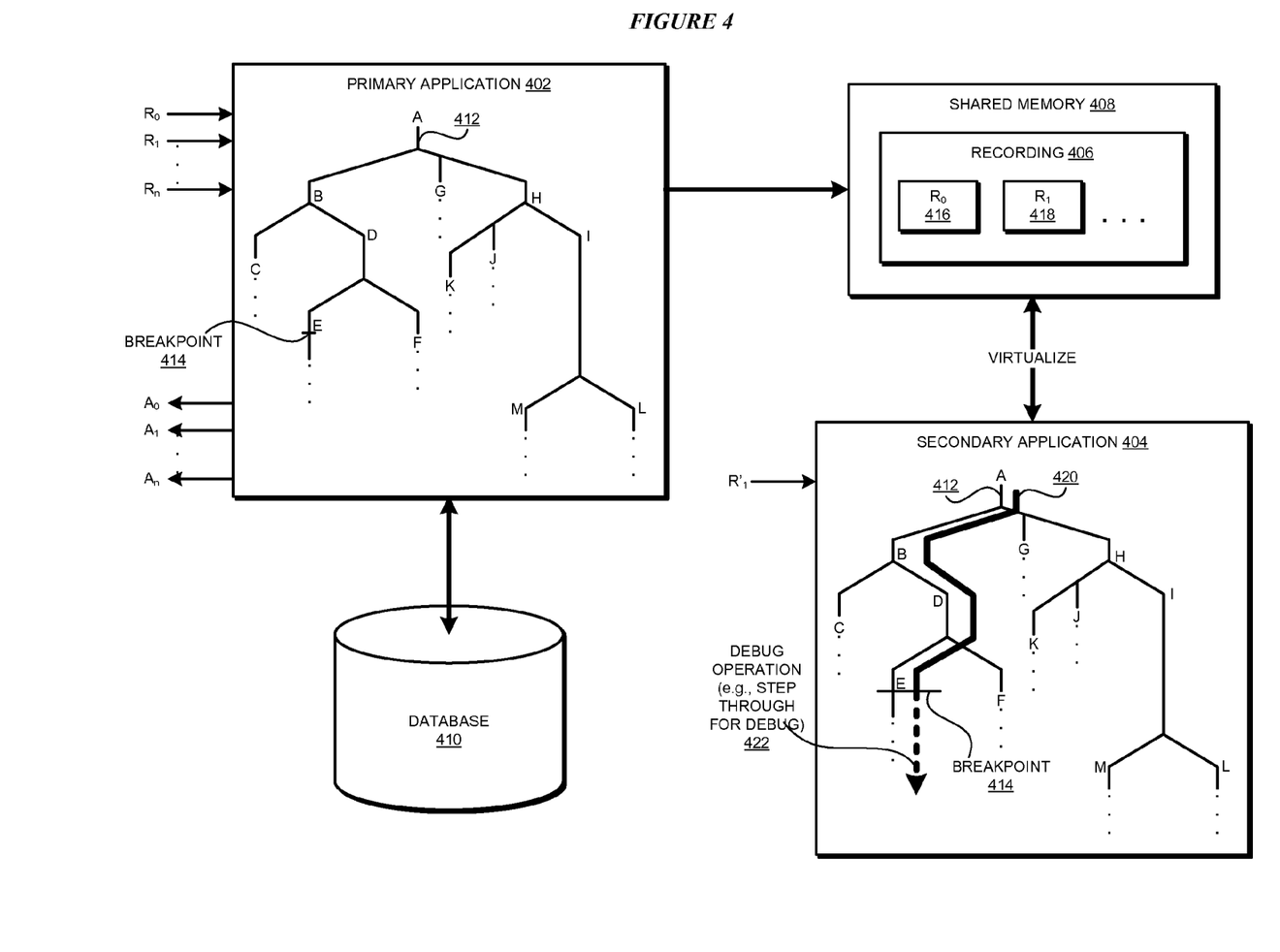
FIG. 4 depicts a block diagram of a process for minimally disruptive debugging in a production environment in accordance with an illustrative embodiment.

With reference to FIG. 4, this figure depicts a block diagram of a process for minimally disruptive debugging in a production environment in accordance with an illustrative embodiment. Primary application 402 is an example of primary application 304, secondary application 404 is an example of secondary application 306, and recording 406 is an example of recording 308 in FIG. 3.

In one embodiment, an application, such as application 302 in FIG. 3, creates recording 406 in shared memory 408, which is accessible to primary application 402 as well as secondary application 404. For this reason, primary application 402 can continue writing to recording 406 while secondary application 404 is reading from recording 406. In another embodiment (not shown), an application, such as application 302 in FIG. 3, allows recording 406 to be created while primary application 402 progresses but records recording 406 in another location accessible to secondary application 404. Database 410 is a non-limiting example of external resource 310 in FIG. 3.

Path structure 412 shows an example organization of processing paths, which can be taken during the processing of a request, such as any of requests R0, R1 . . . Rn. For example, primary application 402 processes request R0 through a processing path that passes through points A, H, I, and M (path AHIM) in the code of primary application 402. As an example, somewhere in path AHIM, primary application 402 performs an external interaction with database 410 to produce response A0 for request R0. The processing of request R0 creates data 416 in recording 406. All or a part of the recording for a request can be discarded if the processing of the request reaches completion and does not hit any breakpoints. This discarding minimizes the amount of recording in the shared memory.

Assume that the application sets breakpoint 414 at some point in the code of primary application 402. For example, suppose that breakpoint 414 appears in the path after point E in the code. If and when the processing of a request goes past point E, breakpoint 414 will be reached.

Suppose, as an example, that the processing of request R1 follows path ABDE. The processing of request R1 from point A in the code is recorded as data 418 in recording 406.

As can be seen, path ABDE causes breakpoint 414 to be reached during the processing of request R1. Accordingly, request R1 is reissued as request R1' to secondary application 404. The processing of request R1 continues past breakpoint 414 in primary application 402, and the data of such continued processing is recorded as data 418 in recording 406. The continued processing of request R1 produces response A1 with insignificant delay caused by breakpoint 414.

Secondary application 404 begins processing reissued request R1' by virtualizing recording 406 from shared memory 408. Note that primary application 402 may be writing additional data to recording 406, such as for the processing of request Rn at primary application 402 to produce response An. To clarify, "virtualization" means that the primary application can have access to the database through an actual connection but the secondary application's access to the database is imitated or replaced, such that secondary application does not connect to the database, but replays from a recording.

In secondary application 404, the processing of request R1' proceeds along path 420 from point A in the code up to breakpoint 414 in the code of secondary application 404. For example, the application according to an embodiment allows a debugger to execute path ABDE up to breakpoint 414. Thereafter, the application performs, or causes the debugger to perform, debug operation 422 through the code of secondary application 404 starting at breakpoint 414. As a non-limiting example, debug operation 422 includes stepping through the code after breakpoint 414.

Figure 5:
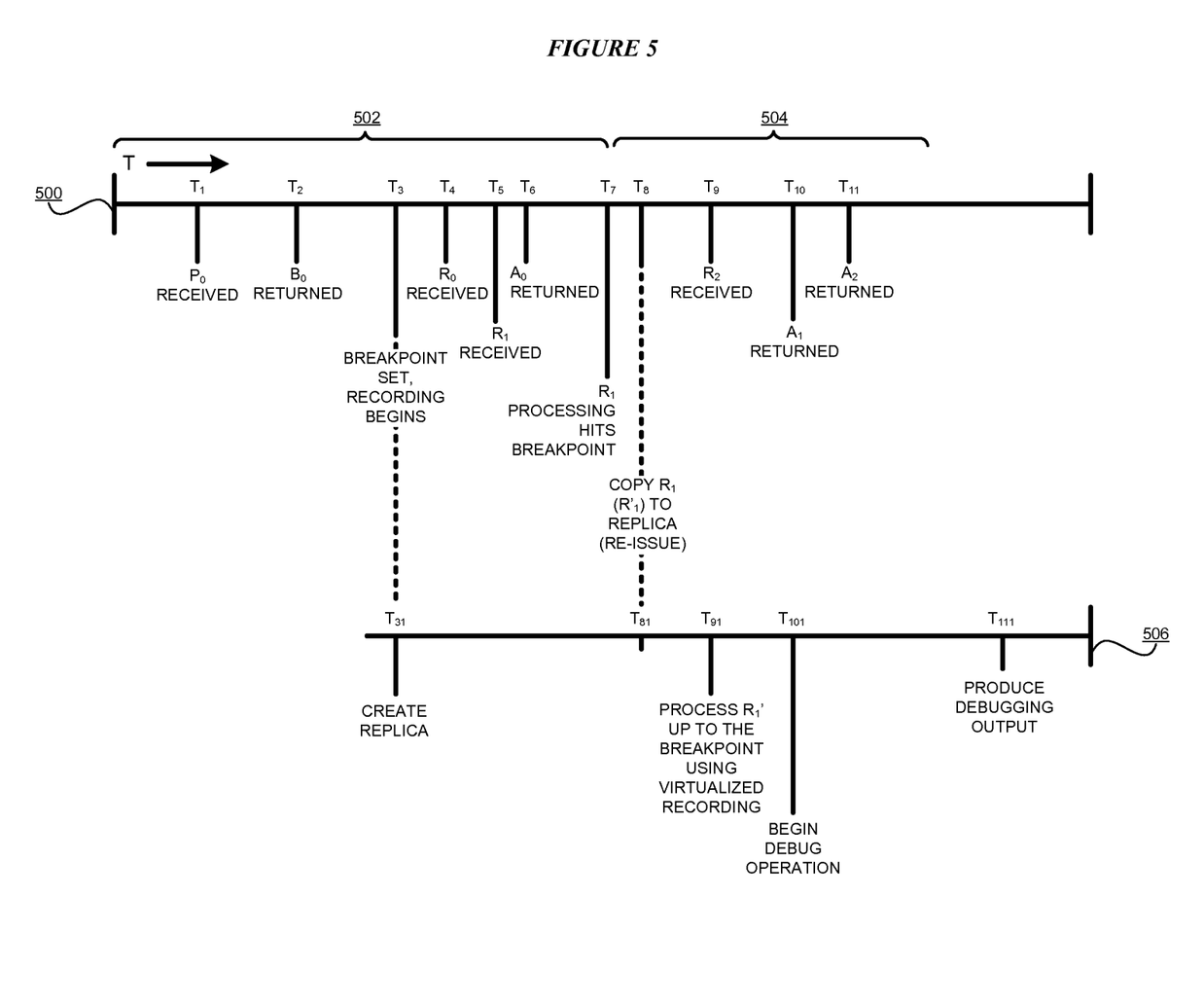
FIG. 5 depicts an example timeline of an example minimally disruptive debugging in a production environment in accordance with an illustrative embodiment.

With reference to FIG. 5, this figure depicts an example timeline of an example minimally disruptive debugging in a production environment in accordance with an illustrative embodiment. Timeline 500 includes timeline portion 502, which described an example sequence of events at primary application 402 in FIG. 4.

Timeline 506 runs in parallel with timeline 500. In one embodiment, portion 504 of timeline 500 also occurs at primary application 402 and timeline 506 occurs at secondary application 404 in FIG. 4. In another embodiment, portion 504 occurs in secondary application 404 and timeline 506 occurs in primary application 402 in FIG. 4.

First, assume according to the first embodiment that portions 502 and 504 of timeline 500 both occur at primary application 402 and timeline 506 occurs at secondary application 404. Primary application 404 receives request P0 at time T1. Primary application 402 processes request P0 and returns result B0 at T2.

A breakpoint is set in primary application 402 at T3. The recording begins at T3 as well. Timeline 506 begins a time T31, which is the same as time T3 or sometime after T3 but before the breakpoint is reached in primary application 402.

Continuing in timeline portion 502, primary application 402 receives request R0 at T4. Primary application 402 receives request R1 at T5. Primary application 402 completes processing of R0 and returns response A0 at T6.

At time T7, the processing of request R1 reaches the breakpoint that was set at T3. At time T8, which is as soon as practicable after time T7 in a given implementation, the embodiment causes a reissue of request R1 (R1') to secondary application 404, which is operating on timeline 506. Reissued request R1' begins processing at secondary application 404 at time T81. Time T81 is as soon as practicable after time T8 in the given implementation.

In timeline portion 504, primary application 402 continues processing request R2 and receives request R2 at T9. At T10, primary application 402 returns response A1 for request R1. At T11, primary application 402 returns response A2 for request R2. From time T3 onwards in timeline 500, primary application 402 records the processing information for processing R0, R1, and R2 into a recording as described in this disclosure.

In timeline 506, between times T81 and T91, secondary application 404 processes request R1' up to the breakpoint using the virtualized recording from timeline 500. At time T101, the embodiment begins debug operation from the breakpoint in the code of secondary application 404. At time T111 the embodiment produces an output of the debugging operation. For example, the output can be a location in the code of secondary application 404 that is suspected for a faulty operation in the processing of request R1 in the production environment.

Next, in the second embodiment, portion 504 occurs in secondary application 404 and timeline 506 occurs in primary application 402 in FIG. 4. At T7 when the processing of R1 reaches the breakpoint in primary application 402, secondary application 404 assumes the role of the production application and the processing of R1 continues in secondary application 404 in the form of processing of request R1' from an equivalent of time T81 on timeline portion 504. The processing of request R2, which is shown on portion 504 of timeline 500 occurs in secondary application 404. Secondary application 404 returns A1 at T10 in response to R1'.

Secondary application 404 contributes data of the processing of R1' to the recording. Primary application 402 uses such data from the recording to perform a debug operation on the processing of R1 after the breakpoint. The debug operation begins in primary application 402 on timeline 506 at a T101. Primary application 402 produces an output of the debugging operations at time T111.

Figure 6:
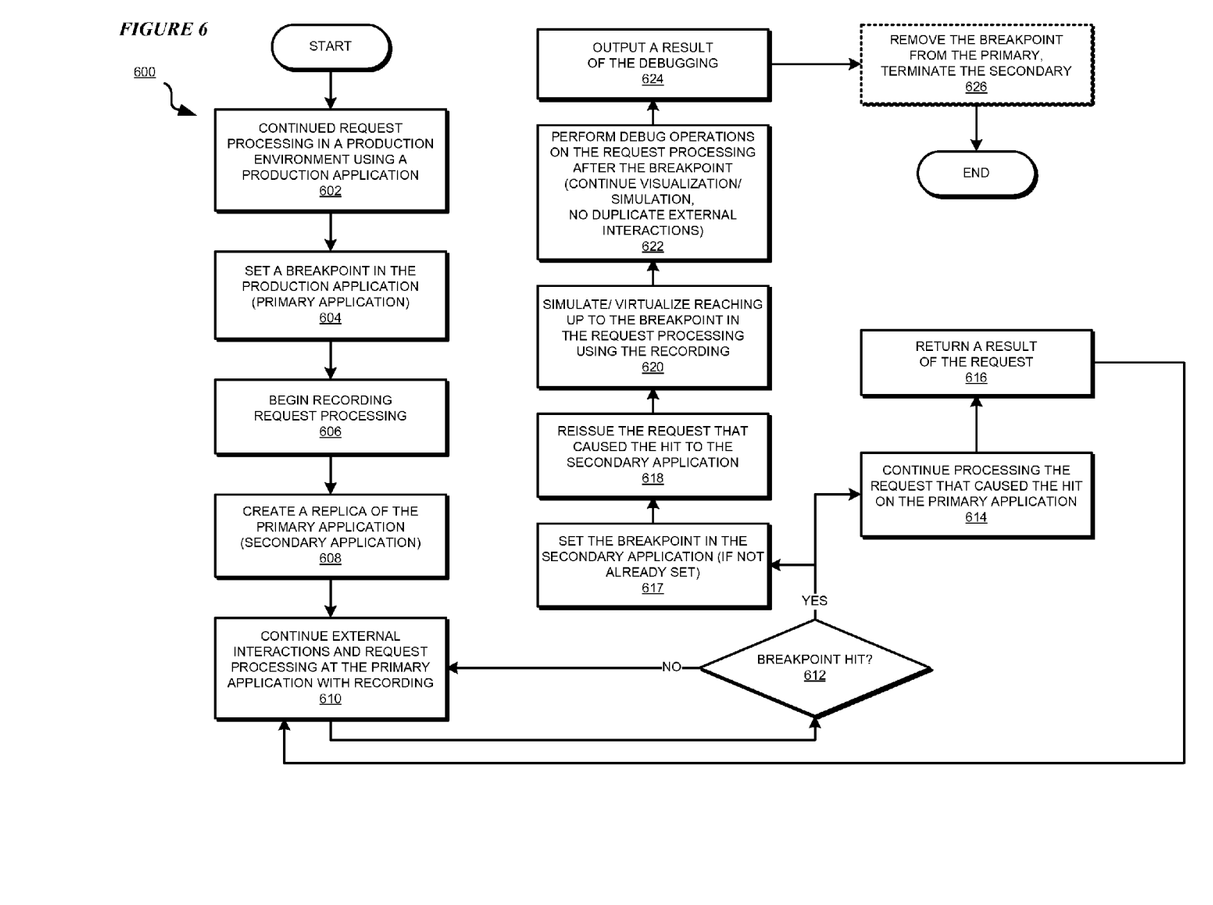
FIG. 6 depicts a flowchart of an example process for minimally disruptive debugging in a production environment in accordance with an illustrative embodiment.

With reference to FIG. 6, this figure depicts a flowchart of an example process for minimally disruptive debugging in a production environment in accordance with an illustrative embodiment. Process 600 can be implemented in application 302 in FIG. 3.

The application allows continued request processing in a production environment using a production application (block 602). The application sets a breakpoint in the production application, making the production application a primary application (block 604).

The application begins recording the request processing information from the primary application into a recording data in a shared data storage space (block 606). The application creates a replica of the primary application (block 608). The replica becomes the secondary application. The application allows the request processing to continue at the primary application, including the external interactions with external resources during such processing (block 610). The secondary application can be created before, but no later than the operation of block 612 and the same breakpoint is set in the secondary before the breakpoint is reached in the primary.

The application determines whether the breakpoint has been reached (block 612). If the breakpoint is not reached ("No" path go block 612), the application returns to block 610 and continues the processing or requests at the primary application.

If the breakpoint is reached ("Yes" path go block 612), the application follows two sequences of actions. In a first sequence, the application allows the primary application to continue processing the request, which caused the breakpoint to be reached (block 614). The application causes a result of the processing of that request to be returned from the primary application (block 616). The application then returns process 600 to block 610 to continue processing more requests at the primary application.

If the breakpoint is not already set in the secondary, the application sets the same breakpoint in the secondary (block 617). In a sequence of actions, the application reissues the request, which caused the breakpoint to be reached in the primary application, to the secondary application (block 618). The application simulates or virtualizes reaching up to the breakpoint at the secondary application in the processing of the reissued request using the recording produced by the primary application (block 620).

The application then performs a debug operation on the reissue request processing at the secondary application without causing any duplication of external interactions at the external resource (block 622).

The application outputs a result of the debugging (block 624). The application may end process 600 thereafter.

The secondary can exist for the life of the primary. Optionally, if an implementation warrants, in response to the debugging activity completing, the application may remove the breakpoint from the code of the primary application, terminate the secondary application, or both (block 626). The application ends process 600 thereafter.

Thus, a computer implemented method, system or apparatus, and computer program product are provided in the illustrative embodiments for minimally disruptive debugging in a production environment. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
setting a breakpoint in an application;
beginning, responsive to the setting, recording information about a processing of a request in the application;
detecting that the breakpoint is reached in the application during the processing of the request;
creating a replica of the application, the replica including the breakpoint, the application becoming a primary application and the replica becoming a secondary application in a production environment; and
performing, in the secondary application, a debugging operation during a processing of a copy of the request after the breakpoint in the secondary application.

2. The method of claim 1, further comprising:
reissuing the request to the secondary application as the copy of the request; and
processing the copy of the request in the secondary application up to the breakpoint using the recorded information.

3. The method of claim 2, further comprising:
avoiding, during the processing of the copy of the request in the secondary application, a data interaction with a resource in the production environment, wherein a result of the data interaction is obtained from the recorded information.

4. The method of claim 1, further comprising:
performing, during the processing of the request at the application, a data interaction from the application with a resource in the production environment; and
recording a result of the data interaction into the recorded information.

5. The method of claim 1, further comprising:
continuing, after the detecting, the processing of the request in the primary application; and
returning a response to the request from the primary application.

6. The method of claim 1, further comprising:
processing a second request in the application, wherein the processing of the second request does not reach the breakpoint before returning a response to the second request.

7. The method of claim 1, further comprising:
storing the recorded information in a shared memory, wherein the shared memory is accessible to the primary application and the secondary application in the production environment.

8. The method of claim 7, wherein the primary application and the secondary application are instances of the application, and the instances execute in one data processing system in the production environment, the shared memory being a component of the one data processing system.

9. A method comprising:
setting a breakpoint in an application;
beginning, responsive to the setting, recording information about a processing of a request in the application;
detecting that the breakpoint is reached in the application during the processing of the request;
creating, a replica of the application, the replica including the breakpoint, the application becoming a secondary application and the replica becoming a primary application in a production environment; and
performing, in the secondary application, a debugging operation during a processing of a copy of the request after the breakpoint in the secondary application.

10. The method of claim 9, further comprising:

reissuing the request to the primary application as the copy of the request; and processing the copy of the request in the primary application up to the breakpoint using the recorded information.

11. The method of claim 10, further comprising:

avoiding, during the processing of the copy of the request in the primary application, a data interaction with a resource in the production environment, wherein a result of the data interaction is obtained from the recorded information.

12. The method of claim 9, further comprising:

performing, during the processing of the request at the application, a data interaction from the application with a resource in the production environment; and recording a result of the data interaction into the recorded information.

13. The method of claim 9, further comprising:

continuing, after the detecting, the processing of the request in the secondary application; and returning a response to the request from the secondary application.

14. The method of claim 9, further comprising:

processing a second request in the application, wherein the processing of the second request does not reach the breakpoint before returning a response to the second request.

15. The method of claim 9, further comprising:

storing the recorded information in a shared memory, wherein the shared memory is accessible to the primary application and the secondary application in the production environment.

16. The method of claim 15, wherein the primary application and the secondary application are instances of the application, and the instances execute in one data processing system in the production environment, the shared memory being a component of the one data processing system.

17. The method of claim 9, wherein the method is embodied in a computer program product comprising one or more computer-readable storage devices and computer-readable program instructions which are stored on the one or more computer-readable storage devices and executed by one or more processors.

18. The method of claim 9, wherein the method is embodied in a computer system comprising one or more processors, one or more computer-readable memories, one or more computer-readable storage devices and program instructions which are stored on the one or more computer-readable storage devices for execution by the one or more processors via the one or more memories and executed by the one or more processors.

19. A computer program product comprising one or more computer-readable storage devices, and program instructions stored on at least one of the one or more storage devices, the stored program instructions comprising:

program instructions to set a breakpoint in an application;

program instructions to begin, responsive to the setting, recording information about a processing of a request in the application;

program instructions to detect that the breakpoint is reached in the application during the processing of the request;

program instructions to create a replica of the application, the replica including the breakpoint, the application becoming a primary application and the replica becoming a secondary application in the production environment; and program instructions to perform, in the secondary application, a debugging operation during a processing of a copy of the request after the breakpoint in the secondary application.

20. The computer program product of claim 19, the stored program instructions further comprising:

program instructions to reissue the request to the secondary application as the copy of the request; and program instructions to process the copy of the request in the secondary application up to the breakpoint using the recorded information.

* * * * *